W. M. Ferry, Jr.,
Circular Saw Mill.
Nº 17,829.    Patented July 21, 1857.
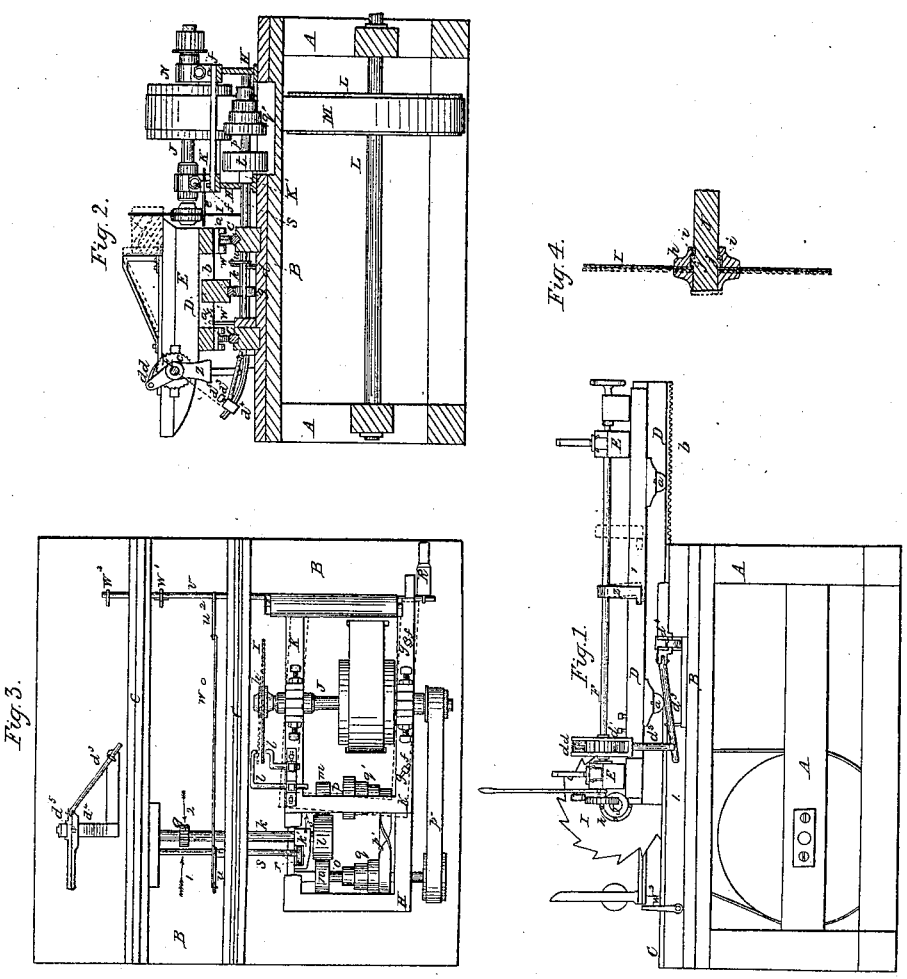

UNITED STATES PATENT OFFICE.

WILLIAM M. FERRY, JR., OF FERRYSBURG, MICHIGAN.

SAWING-MILL.

Specification forming part of Letters Patent No. 17,829, dated July 21, 1857; Reissued April 6, 1858, No. 542.

*To all whom it may concern:*

Be it known that I, WM. M. FERRY, Jr., of Ferrysburg, in the county of Ottawa and State of Michigan, have invented certain new and useful Improvements in Sawmills; and I do hereby declare that the following is a full, clear, and exact description of the same, reference being had to the accompanying drawings, forming part of this specification, in which—

Figure 1 is a side elevation of a sawmill with my improvements. Fig. 2, is a vertical transverse section of the same. Fig. 3, is a plan or top view of ditto the carriage being removed. Fig. 4, is a detached sectional view of the saw and its arbor or spindle.

Similar letters of reference in each of the several figures indicate corresponding parts.

My invention embraces, 1st, an arrangement consisting of a yoke carrying the saw guides, saw arbor and saw boxes, and pivoted at its side next the saw and made adjustable in the path of a circle by means of slots and set screws, as presently described, for the purpose of ranging or controlling more conveniently than heretofore, the cut of the saw or causing it to have a tendency to cut toward the log or toward the slab, by giving it a slight obliquity to a line parallel with the log carriage, and thus prevent the heating of the saw and give it its proper range for cutting accurately.

2nd. It consists in effecting, by means of an eccentric, as presently described, the combination of the log carriage and automatic reversing mechanism, thereby rendering the saw mill capable of self feeding and self gigging.

3rd. It consists in so adjusting the gaging incline that its hinged or pivoted point and its opposite end or terminus shall always be at the same and equal distances from the set shaft, thus preventing the liability of the laterally feeding ratchet lever becoming disconnected from the gaging incline at the moment when the carriage has nearly completed its backward movement and also insuring a more regular set than by the means heretofore adopted.

To enable others skilled in the art to make and use my invention I will proceed to describe its construction and operation.

A, is intended to represent the framing, and B, the flooring of a saw mill building.

C, C, are rails for the carriage to run upon.

D, is the carriage furnished with friction wheels $a, a$, and with a toothed rack $b$, on its underside.

E, E, are the head blocks of the carriage, F the shaft with feeding ratchet $c$, and pawls $d, d$, for feeding the head blocks laterally.

$g$, is a pinion for giving motion to the carriage by gearing into the rack $b$, of the same.

H, is a metal frame bolted firmly to the flooring B, and serving for carrying all the mechanism bearing a close relation to the saw.

I is the saw, J, its arbor and K a yoke resting upon the metal frame and having the arbor of the saw and the muley guides $e, e$, arranged on it.

L, M, N, represent the gearing for driving the saw arbor.

The above described parts as a general thing are all common to saw mills and are simply referred to in order to explain more readily and clearly my improvements which are as follows.

The yoke K, is attached to the frame H, (which is made of metal,) by means of set screws $f, f, f, f$, and slots $g, g, g, g$, so that it with the saw and arbor may be adjusted as shown in red lines in Fig. 3, and the saw thereby caused to have an inclination to cut toward the log even while cutting cross grain stuff.

The collar $h$, of the saw is furnished with a socket $i$, of greater length than the length of the collar $j$, on the arbor, so that the saw may have end play independently of the arbor and its attachments.

The shaft $k$, of the pinion $g$, is fitted in a sliding box $k'$, and furnished with a pulley $l$, on its inner end. This pulley is situated between two leather friction wheels $m, n$, which have shafts $o, p$, which carry each a cone of pulleys $q, q'$, one cone being arranged just the reverse of the other and the two being connected together by a crossed belt $p'$. In the sliding box $k'$ of the shaft is fitted loosely a cam or eccentric $r$, which is made fast on a shaft $s$. By this arrangement it may be evident that by turning the shaft $s$, a quarter of a revolution in the direction of the arrow 1, the eccentric will cause the sliding box $k'$, to move in the direction of the arrow 3, and in moving to move the shaft $k$, and pulley $l$, sufficiently far to cause the pulley $l$, to bite firmly upon the leather friction wheel $m$, and thus be in a condition for being turned thereby when the friction wheel $m$, is set in motion by the belts $p'$, and $p''$, and it is desired to gig the carriage D, back. And it may also be evident that by turning the shaft $s$, in the direction of the arrow 2, the eccentric will cause the sliding box $k'$, to move the pulley $l$, in contact with the leather friction wheel $n$, and thus place it in a condition for being operated thereby when the friction wheel $n$, is set in motion and it is desired to gig forward.

To render the shifting of the pulleys automatic, at the back and forward movements of the carriage a projection or arm $w$, is placed at right angles on the shaft of the eccentric, this arm is connected with an arm $u'$ on the rocking shaft $v$, by a rod $w$. On the rocking shaft $v$, two other projections or arms $w'$, $w^2$, are arranged one being placed at right angles to the other so that when one is down or out of the way of the carriage the other is up or in the way of the same. One of these arms is operated by a stationary cross piece $x$, of the carriage and the other by an adjustable self-holding trip $z$, on the shaft of the feeding ratchet $c$, $w'$, being operated as the carriage is gigged back; and $w^2$, as the carriage is gigged forward.

To regulate the extent of movement to the carriage the trip $z$, is fitted over and made capable of sliding on the shaft E, so that it may be shifted as illustrated by red dotted lines in Fig. 1. The trip $z$, owing to being fitted loosely over the shaft as shown no matter how adjusted holds itself firm by biting upon the shaft when inclined as illustrated by full red lines in Fig. 1.

To render the feeding of the board laterally, by the head blocks, automatic, the pawl frame $d'$, of the feed ratchet $c$, is arranged loosely on the shaft F, and is furnished with an extension arm $d^2$, which is suspended so as to barely clear the flooring B. And to one side, and at some distance forward of the saw an inclined plane $d^3$, is provided for said arm to run up as the carriage is gigged back. The inclined plane is made adjustable on a curved way $d^4$, by means of set-screw $d^5$. By this arrangement it may be evident that as the arm ascends the inclined plane as illustrated in red in Fig. 2, it is raised gradually and the pawls $d$, $d$, consequently made to turn the feed ratchet $c$, which in turn turns the shaft F, and causes the pinions on its two ends to take into the racks of the head blocks and thus cause the head blocks to have sufficient lateral movement to feed the log the required distance, as illustrated by black and red dotted lines in Fig. 2. The amount of the lateral feed is regulated by the obliquity and inclination of the incline plane $d^3$, from a horizontal line to the flooring, and to a parallel line with the edge of the carriage, both of which are regulated by the extent of movement which the incline plane has over the curved way $d^4$.

This saw mill is automatic in its longitudinal and lateral feed, after it has once been adjusted by the hand lever R, ready for commencing operations; it is free from the objections urged against the use of belts or cogged gear to reverse the motion of the carriage, it is capable of having the extent of its feed both laterally and longitudinally regulated in a moment of time, and viewing it all together it is much to be preferred to the many devices heretofore contrived for accomplishing the same objects as are accomplished by it.

I am aware that circular saws have been rendered adjustable obliquely to the kerf for the purposes described, and therefore

What I claim as my invention and desire to secure by Letters Patent, is—

1. The particular means and their arrangement as described, for accomplishing that end.

2. Effecting by means of an eccentric, the combination of the log carriage and automatic reversing mechanism, thereby rendering the saw mill capable of self feeding and self gigging as set forth.

3. So adjusting the gaging incline $d^3$ that its hinge or pivoted joint and its opposite end or terminus shall always be at the same and equal distances from the set shaft F, as described.

4. Arranging the saw arbor and all the parts bearing a close relation to the saw on a metal yoke K and making said yoke capable of being adjusted so as to stand slightly out of parallel with the edge of the carriage substantially as and for the purpose set forth.

WM. M. FERRY, JR.

Witnesses:
  ED. P. FERRY,
  WM. WALLACE.

[FIRST PRINTED 1912.]